United States Patent [19]

Hassler et al.

[11] 4,282,452

[45] Aug. 4, 1981

[54] METHOD AND CIRCUIT ARRANGEMENT FOR ENERGIZING ULTRASONIC TRANSDUCERS WHICH ARE UTILIZED IN IMPULSE ECHO TECHNOLOGY

[75] Inventors: Dieter Hassler, Uttenreuth; Robert Schwarz, Hessdorf, both of Fed. Rep. of Germany

[73] Assignee: Siemens Aktiengesellschaft, Berlin & Munich, Fed. Rep. of Germany

[21] Appl. No.: 20,866

[22] Filed: Mar. 15, 1979

[30] Foreign Application Priority Data

Mar. 30, 1978 [DE] Fed. Rep. of Germany ....... 2813729

[51] Int. Cl.³ .............................................. H01L 41/08
[52] U.S. Cl. ..................................... 310/317; 310/326
[58] Field of Search ............... 310/316, 317, 326, 327; 73/596–600, 606, 609–611, 629, 632; 128/660, 663; 318/316

[56] References Cited

U.S. PATENT DOCUMENTS

| | | | |
|---|---|---|---|
| 2,562,450 | 7/1951 | Lano, Jr. ......................... | 310/317 X |
| 2,651,012 | 9/1953 | Van Valkenburg et al. .... | 310/317 X |
| 2,842,959 | 7/1958 | Henry ............................. | 310/317 X |
| 3,029,356 | 4/1962 | Renaut ............................ | 310/326 X |
| 3,532,911 | 10/1970 | Roberts et al. ................. | 310/317 X |
| 3,663,842 | 5/1972 | Miller ............................. | 310/327 |

Primary Examiner—Mark O. Budd
Attorney, Agent, or Firm—Hill, Van Santen, Steadman, Chiara & Simpson

[57] ABSTRACT

In an exemplary embodiment particularly applicable to the examination of the human body, for the purpose of energizing with the aim of transmission of an ultrasonic pulse, a high frequency pulse of specific duration and amplitude is in each instance supplied to the ultrasonic transducer. In spite of a substantially reduced maximum energizing voltage, optimum conditions are to be created with regard to the intensity of pulses to be radiated with a simultaneous short pulse duration, so that preferably also switches which are restricted in their maximum switching voltage can be utilized for controlling the ultrasonic transducers. This becomes possible by virtue of the fact that each ultrasonic transducer is subjected to a specifiable number of periods of a sinusoidal or sine-like oscillation with a frequency which energizes the ultrasonic transducer at its useful resonance frequency. Subsequently thereto, a stop signal, preferably an additional number of periods of sinusoidal oscillation of smaller amplitude and with a phase jump of 180° is supplied to the ultrasonic transducer. After-oscillations of the transducer are thus extinguished with certainty.

15 Claims, 7 Drawing Figures

METHOD AND CIRCUIT ARRANGEMENT FOR ENERGIZING ULTRASONIC TRANSDUCERS WHICH ARE UTILIZED IN IMPULSE ECHO TECHNOLOGY

BACKGROUND OF THE INVENTION

The invention relates to a method and an apparatus for energizing ultrasonic transducers which are used in impulse echo technology, in particular, in the examination of the human body, whereby, in order to energize for the purpose of transmitting an ultrasonic pulse, there is fed to the ultrasonic transducer, respectively, an electric high frequency pulse of fixed duration and amplitude.

Ultrasonic transducers of the cited type are utilized particularly in the so-called B-scan technique, wherein an examination subject, for example, the human body, is scanned in a linear fashion with ultrasonic pulses and wherein the echo signals received from the subject are correspondingly recorded in a linear fashion into an areal echo-visual image on a recording apparatus (e.g. a cathode ray oscilloscope). However, the transducers can likewise be those of the A-scan technique or another scan technique. In the case of the B-scan technique, the transducer can be a so-called rotational transducer with a paraboloid reflector. It can likewise also be a transducer capable of linear displacement, or a pivotal transducer for e.g. sector-scan. In this category, finally, are also included transducers of a compound-scan system, and, in particular, also so-called ultrasonic arrays, wherein a plurality of adjacently arranged ultrasonic transducers can be energized in chronological sequence.

In all these applied instances, the electric excitation of the ultrasonic transducers (in particular, piezo-electric transducers) proceeds, in the normal instance, by means of a short pulse of very high amplitude (several 100 V). This type of excitation is the most effective method with regard to use and electronic outlay as long as the voltage amplitudes are not subject to any major restriction. However, such restrictions occur automatically if electronic switches are to be utilized for the purpose of controlling ultrasonic transducers, which switches, due to spatial and functional dimensioning, are restricted in the maximum switching (or interruption) voltage. A particular technique field is here the array technology wherein one or more electronic switches must be allocated to each individual transducer. For reasons of cost and also for reasons of improved spatial utilization, there is an interest in the introduction of integrated switches. The maximum switching (or interruption) voltage of such switches, however, is generally restricted to approximately 30 to 40 V. The introduction of switches with such a limited switching (or interruption) voltage thus leads to a considerable reduction in the voltage amplitude to be energized; in the case of application (for example, the human body), this signifies a considerable loss of penetration depth for the ultrasonic transmission pulses.

SUMMARY OF THE INVENTION

It is the object of the present invention to disclose a means whereby, in spite of substantially reduced maximum energization voltage, optimum conditions are created with regard to the intensity of pulses to be emitted (or radiated), so that preferably also switches with the above-described properties can be utilized for the control of ultrasonic transducers.

The object is achieved in accordance with the invention with a method of the initially cited type in that the ultrasonic transducer is subjected to a specifiable number of periods of a sinusoidal or sine-like oscillation; for example, also a triangular oscillation, with a frequency which energizes the ultrasonic transducer at its useful (or wanted) resonance frequency, and that, subsequently thereto, there is supplied to the ultrasonic transducer a stop signal so that after-oscillations (or vibrations) of the transducer are extinguished with the occurrence of the stop signal.

A circuit arrangement for carrying out the method is inventively characterized by an oscillator for subjecting the ultrasonic transducer to a specifiable number of periods of a sinusoidal or a sine-like oscillation with such a frequency which energizes the ultrasonic transducer at its useful resonance frequency, which oscillator, subsequent thereto, produces a stop signal, preferably a further number of periods of sinusoidal or sine-like oscillation of smaller amplitude and with a phase shift (or jump) of 180°.

The construction of conventional ultrasonic transducers (attenuation member - ultrasonic transducer matching layer-propagation medium e.g. according to U.S. Pat. No. 3,663,842), which has, in the meantime, become standard, leads to a relatively narrow-band system measured on the spectrum of pulse energization. Only a small spectral component of the conventional wide-band energization pulse is thus converted into the acoustic useful signal. The greater portion energizes either other vibration modes or is briefly stored and subsequently fed back again into the signal source. However, if the ultrasonic transducer is energized with a signal waveform whose spectrum largely contains only the desired useful frequency range, then a substantially smaller energization amplitude leads to the same useful effect. A narrower-band energization, however, inevitably results in a longer energization duration. This would lead, without compensating measures, to a lengthening (or prolonging) of the radiated pressure pulse to an undesired extent. The present invention, viewed spectrally, operates with selective energization on the side of the signal form. By means of subsequent superimposition with the stop signal, post-oscillations are cancelled. Thus, the abbreviation (or shortening) of the radiated pressure pulse results. The compensated sinusoidal energization according to the teaching of the invention thus combines the useful effect of a narrow-band energization with the advantage of the brief duration of the pulse energization.

In an advantageous embodiment of the invention, the stop signal should be at the most precisely as great in amplitude as the actual energization amplitude of the sinusoidal or sine-like oscillation. The stop signal, in addition, should be tuned in its frequency spectrum in as narrow-band a fashion as possible to the useful resonance frquency of the oscillator. A voltage pulse of a defined rise time, decay time, and pulse duration (trapezoidal form) can serve as the stop signal. In view of a particular narrow-band property, in a preferred embodiment, however, the stop signal should be an additional number of periods (preferably one period) of sinusoidal oscillation of smaller amplitude and with a phase shift of 180°.

Pulse abbreviation through compensation with oppositely proceeding oscillations (or vibrations) of the ultrasonic transducer is per se already the subject of the U.S. Pat. No. 2,651,012. From this publication, a control system for an ultrasonic transducer is prior knowledge which, in the case of conventional wide-band pulse energization, after a specifiable time delay, produces a second oscillation which is intended to be oppositely directed to the effect of the primary energization pulse. However, it must be noted that, in the case of a transducer system, the transducer oscillation exponentially decaying after emission of the primary energization pulse, is completely undetermined in the number of oscillations. The number of oscillations is dependent upon a plurality of parameters, e.g. acoustic characteristic (or surge) impedance of the sound propagation medium. Related to such a decay oscillation having an indeterminate number of oscillations and an indeterminate attenuation characteristic, according to U.S. Pat. No. 2,651,012, the compensating oscillation which is to be added with a delay, given an exactly equal attenuation characteristic, must then also always have the same phase displacement of 180° relative to the decaying oscillations of the primary energization. However, such conditions can in practice hardly be achieved or if so, only with a particularly high circuit-technical outlay. The forming (or shaping) tuning circuits in the two pulse channels of the circuit arrangement of the U.S. Pat. No. 2,651,012 alone hardly allow a reliable tuning of primary oscillation and compensating oscillation in the above-desired manner even when oscillators are introduced having uniformly specified properties. A change of such an oscillator into one having other properties then, however, already leads to a complete mistuning of the entire control system. The change of the oscillator thus requires re-tuning which, in the case of the described control system of the aforementioned U.S. patent, must take place on a plurality of individual tuning members, such as tuning capacitors, tuning inductances, and tuning resistances. In contrast herewith, in the present invention, the control of the ultrasonic transducer proceeds with a fixedly specified number of periods of a sinusoidal or sine-like oscillation at the useful resonance frequency of the transducer. However, the duration of the energization of the transducer at its useful resonance frequency is thus exactly fixedly specified. At the end of the energization time, the transducer vibration decays with natural (or self resonant) frequency without further energization. The stop pulse set precisely at the end of the energization produces counter-oscillation of the transducer with, in turn, a fixedly specified number of periods (preferably one period). This effects a second decaying operation subsequent to energization by the stop pulse, again with the resonance frequency of the transducer, but with opposite phase. Since the transducer in both instances, specifies the decay properties, no phase displacement (or shift) can take place between the first decay oscillation, due to primary excitation, and the second decay oscillation, due to the stop pulse. The two decay oscillations are independent of the properties of the transducer, or the stray parameters in the control circuit. There thus results exact compensation of the decay operations and hence optimum pulse reduction in the above sense.

In practice, equal echo amplitudes as in the state of the art are obtained in the manner according to the invention with excitation (or energization) amplitudes which are already smaller by at least a factor of five (5) compared with those of the methods of the state of the art. This already permits the introduction of control switches with a relatively low switching (or interruption) voltage. The energizing phase is exactly restricted in duration and extremely short. There thus results a defined interference-free echo signal reception. The gain by the factor five results from the adaptation (or matching) of the excitation waveform to the general properties (natural or self resonance) specifically of the ultrasonic transducer. Other major parameters of the transducer systems utilized today, such as e.g. the acoustic characteristic (or surge) impedance of the attenuation member and the adaptation layer, have not yet been taken into consideration. Thus, if these system parameters are also adapted (or matched) in this manner to the compensated sinusoidal energization, an additional amplitude gain by approximately the factor of two (2) results. The narrow-band compensated sinusoidal energization corresponds more to the harmonic operation for which the transducer represents a $\lambda/2$-line whose terminal impedance is transformed to the sound emitting acoustic gate (interface). Thus, it is advantageous if, given a compensated sinusoidal energization, in a further embodiment of the invention, the acoustic characteristic (or surge) impedance of an attenuation member, which is disposed on the surface of the ultrasonic oscillator opposite the radiation surface, is also matched to the characteristic impedance of the propagation medium. Through this adaptation (or matching), the minimum reflection factor in the receiving operation is simultaneously achieved. Thus, the compensated sinusoidal energization already brings about a considerable gain in intensity even in utilization with a conventional system. The adaptation (or matching) of the conventional system to the compensated sinusoidal energization brings about an additional gain.

In a further advantageous embodiment of the invention, the ultrasonic transducer is to be subjected to a total of two periods of a sinusoidal oscillation which energize the oscillator at its useful resonance frequency. A third period of sinusoidal oscillation having a smaller amplitude with a phase shift of 180° is to follow this. The two periods of energization oscillation and one period of stop oscillation represent an optimum with regard to the two demands for as great an acoustic pressure-amplitude as possible, on the one hand, and as small a pulse duration as possible, on the other hand.

Further advantages and details of the invention shall be apparent from the following description of exemplary embodiments on the basis of the accompanying sheets of drawings in conjunction with the subclaims; and other objects, features and advantages will be apparent from this detailed disclosure and from the appended claims.

BRIEF DESCRIPTION OF THE DRAWINGS

FIG. 5 consisting of FIGS. 5A and 5B shows a detailed representation of the embodiment according to FIG. 4.

DETAILED DESCRIPTION

In realizing an embodiment of the invention, the ultrasonic transducer (e.g. piezo-electric transducer) could be directly included in an oscillator as the frequency-determining element with the capacitive component of its electric impedance or with its mechanical oscillation capability. However, it is disadvantageous that the capacitance of different transducers can vary greatly given the same resonance frequency. Thus, a tuning of the oscillator to the respective transducer would be necessary.

More favorable conditions result when a component independent of the transducer serves as the frequency-determining element.

Figure 1:
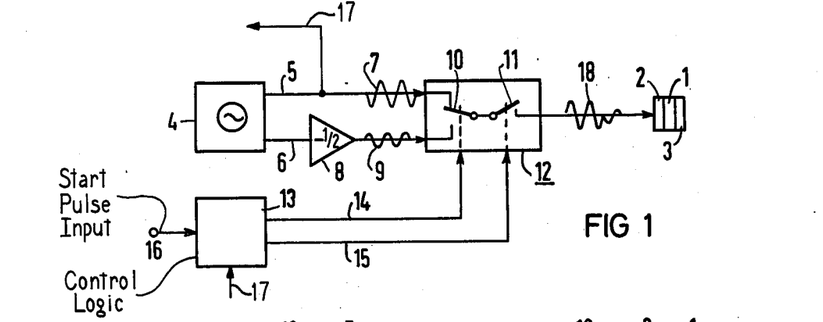
FIGS. 1 through 4 show four different embodiments by means of basic circuit diagrams.

The basic circuit diagram of FIG. 1 illustrates an ultrasonic transducer (piezo-electric transducer) 1 which is covered with an attenuation member on the side facing the radiation surface. The radiation surface, for the purpose of adaptation to the examination medium (here a biological tissue), is provided with an $n \cdot \lambda/4$-layer 3 ($n = 1, 3, 5$, etc.), which consists of a material whose characteristic (or surge) impedance corresponds approximately to the geometric mean of the characteristic impedance of the examination medium and the attenuation member. Araldite preferably serves as the material. Multi-stage or constant adaptation layers, such as are known from transmission theory, can also be utilized. In order to activate the ultrasonic transducer 1 with sinusoidal oscillations, there is an oscillator 4 which comprises, as the frequency determining element, e.g. an oscillator quartz (or piezo-electric crystal) or electric LC-oscillatory (or resonant) circuits. Oscillator 4 is free-running; i.e. it continuously produces at its outputs 5 and 6 a sinusoidal voltage 7 with the natural (or self resonant) oscillation frequency of the ultrasonic transducer 1. The sinusoidal voltage at the output 6 of oscillator 4 is shifted in phase through 180° by means of a phase inversion (or reversal)—and attenuation installation 8, and is simultaneously attenuated to approximately half the amplitude. (The amplitude attenuation of apparatus 8 is variably adjustable.) The result is then the continuous sinusoidal oscillation 9 at the output of the installation 8. Since both sinusoidal oscillations 7 and 9 are continuous, the desired periods must be cut out (selected) by the corresponding switching times of analog switches 10 and 11, of a switching installation 12. The actuation (or control) of switches 10 and 11 in the desired manner proceeds by means of control logic 13 via control lines 14 and 15, respectively. The control logic 13 is constructed in such a manner that, subsequent to the start pulse at the start pulse input 16, it recognizes, via an interrogation (or sample) line 17 from the oscillator 4, the next-following passage through zero of the sinusoidal oscillation 7, and closes switch 11 in the illustrated switching position of switch 10 via switching line 15. After four additional passages through zero of the sinusoidal oscillation 7 (end of the second period) the changeover switch 10 is then operated into the lower switching position by the logic 13 via the switching line 14. Thus, a switchover operation is carried out from sinusoidal oscillation 7 to the sinusoidal oscillation 9. Following termination of a full period of this sinusoidal voltage 9 (third passage through zero, or first repetition of the passage through zero in the direction e.g. of negative amplitude) switch 11 is opened again by logic 13 via the control line 15. There results, as the product of this control mechanism, the sinusoidal output oscillation 18 which is composed of a total of two periods of the sinusoidal oscillation 7 and a period of the sinusoidal oscillation 9 following with a 180° phase shift. In the exemplary embodiment of FIG. 1, start pulses at the input 16 for the logic 13 are generally the clock pulses of that particular clock pulse generator (not illustrated) which are emitted in the transmit pulse of the ultrasonic transmission.

If the oscillator 4 is only to be briefly switched to oscillation operation during the transmission phases (abandonment of continuous operation), the frequency-determining elements of the oscillator 4 must manifest short buildup- and decay-times. However, the buildup and decay is characterized by the transitional behavior of the frequency-determining element. It can therefore be advantageous, in such an applied instance, to introduce, as the frequency-determining element, a relatively wide-band and therefore rapidly building-up frequency element. Oscillators which meet these conditions are e.g. the Wien bridge oscillator, the RC-phase-shifter oscillator, and the oscillator with an all-pass network of the second order. A further possibility is that, with the switching on and off, a Dirac-like pulse is switched (or offered) to the frequency-determining element. Such a pulse accelerates the buildup and brakes the decay. Basically, it is also possible to operate (or control) all the described oscillator types in such a manner that they are switched to transmission in a preparatory manner a specified period prior to the emission of the transmit pulse, respectively. The full transmission amplitude is then already available at oscillator 4 for the respective following transmission time. Subsequent to release of a transmit signal, the oscillator can then again be switched off.

By way of contrast, an oscillator which is relatively simple and problem-free in construction is obtained using a square wave generator as the basis. Square wave generators can be readily conceived such that they start to oscillate virtually without delay (the initial value conditions are relatively simple to adhere to). By means of integrators, the square wave can be converted into a triangle. From the triangle it is possible to generate a sine signal without all too great an outlay, for example, through introduction of non-linear elements and low-passes, or the like. This sine signal is hardly distorted (can be practically free of distortion). The demands regarding the deviation from the pure sine form as well as the demands for frequency stability, side-band noise, etc., then correspond in advance to the conventional demands in pulse-echo technology.

However, integrators which are realizable in practice are never free of zero point drift. Thus, for this reason, the square wave signal of the square wave generator should not be directly integrated. On the contrary, a triangle (or delta) controlled square wave generator should be introduced whose control delta voltage is conveyed out of the square wave generator and is transformed (or converted) to the sine in the described manner. Accordingly, a frequency-determining element is thus selected whose transitional behavior approaches as closely as possible the desired sine progression in the switch-on moment. The integrator is such an element. Since, however, a sine oscillator with only one integrator cannot alone be brought to oscillate, but a square wave generator can be brought to oscillate, and the square wave, in turn, well corresponds to the step function of the switching-on and -off, in a preferred embodiment, an astable oscillator is advisable as the basic element. An astable oscillator as the triggerable function generator (it supplies the triangle- or delta- and square wave-signal) can in response to a logic signal, be started and/or stopped in the passage through zero.

Figure 2:
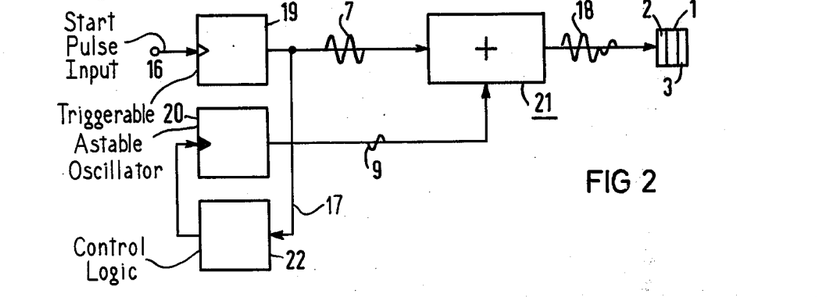
Figure 3:
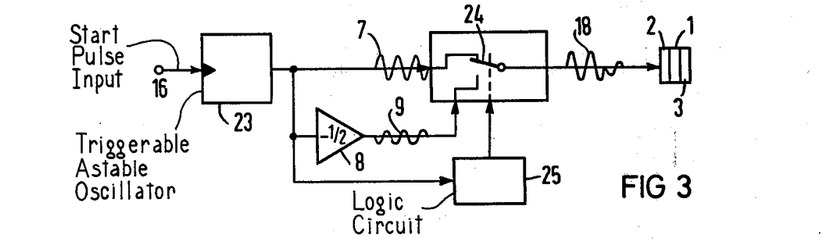
Figure 4:
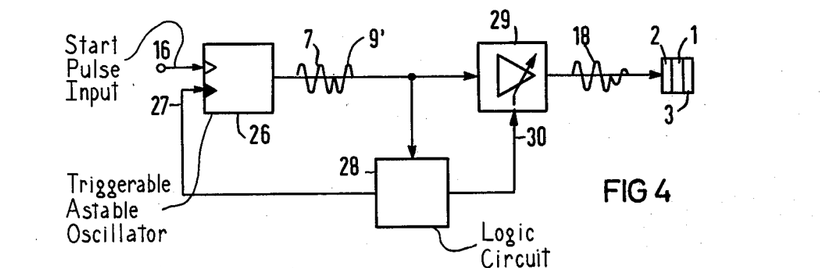

The sample embodiments of FIGS. 2 through 4 operate with astable oscillators as function generators.

FIG. 2 again illustrates the ultrasonic transducer 1 with attenuation member 2 and adaptation (or matching) layer 3. The circuit arrangement for operating the transducer 1 now comprises a total of two triggerable oscillators 19, 20, and adding element 21, and a logic control circuit 22. In response to a start pulse at start input 16, the oscillator 19 emits a double period of the sinusoidal oscillation 7 which directly reaches the transducer 1 via adding element 21. The end of this double oscillation 7 is recognized by the logic 22 (either from the passages through zero or from oscillator-internal signals). The logic 22 subsequently starts the second triggerable oscillator 20 which supplies a period of sinusoidal oscillation 9 of opposite phase position and approximately half the amplitude to the transducer 1 via the adding element 21. Thus, there again results, relative to transducer 1, the oscillation combination 18 as it is already illustrated in the embodiment of FIG. 1.

The exemplary embodiment of FIG. 3 illustrates a modification of such a type that only a single triggerable oscillator 23 is introduced which, in response to a start pulse at the input 16, releases a total of three periods of the sinusoidal oscillation 7. The first two periods of the sinusoidal oscillation travel directly in the direction of ultrasonic transducer 1 via a switch 24 in the illustrated upper switching position. The end of the second period is, in turn, recognized by a logic circuit 25 which subsequently switches switch 24 into the lower switching position. In this lower switching position, the oscillator signal 9, inverted and halved in amplitude at installation 8, now reaches transducer 1 with the third and last period. Thus, there again results the desired composite signal 18. Subsequent to connection of this third component, at the latest after a new start signal at the input 16 of oscillator 23, switch 24 must again be returned to the illustrated initial upper switching position.

FIG. 4 illustrates by means of a basic circuit diagram an embodiment comprising an oscillator 26 which manifests two trigger inputs 16 and 27. In the case of a start pulse at input 16, oscillator 26 initially produces at its output two periods of the sinusoidal voltage 7. The end of the second period is recognized by the logic circuit 28 and is responded to with a second start pulse for the input 27 of oscillator 26. Oscillator 26 then produces a third period oppositely disposed in phase. As illustrated in FIG. 4, the third period, as sinusoidal voltage 9', can manifest the same amplitude as sinusoidal voltage 7. In order to arrive from such an oscillation to half the amplitude, the period 9' must then be adjusted to half the amplitude by means of control amplifier 29. The control proceeds by means of the logic circuit 28 via the control input 30 of the control amplifier 29 for the purpose of amplification factor control. However, oscillator 26 can likewise also be so designed that, in the case of a start pulse at the start input 27, it produces a third period of sinusoidal oscillation of half the amplitude as well as of opposite phase. This oscillation then would correspond as to amplitude as well as to phase to the oscillation 9 of the embodiments of FIGS. 1 through 3. In such an instance, the control amplifier 29 retains its normal amplification.

Figure 5A:
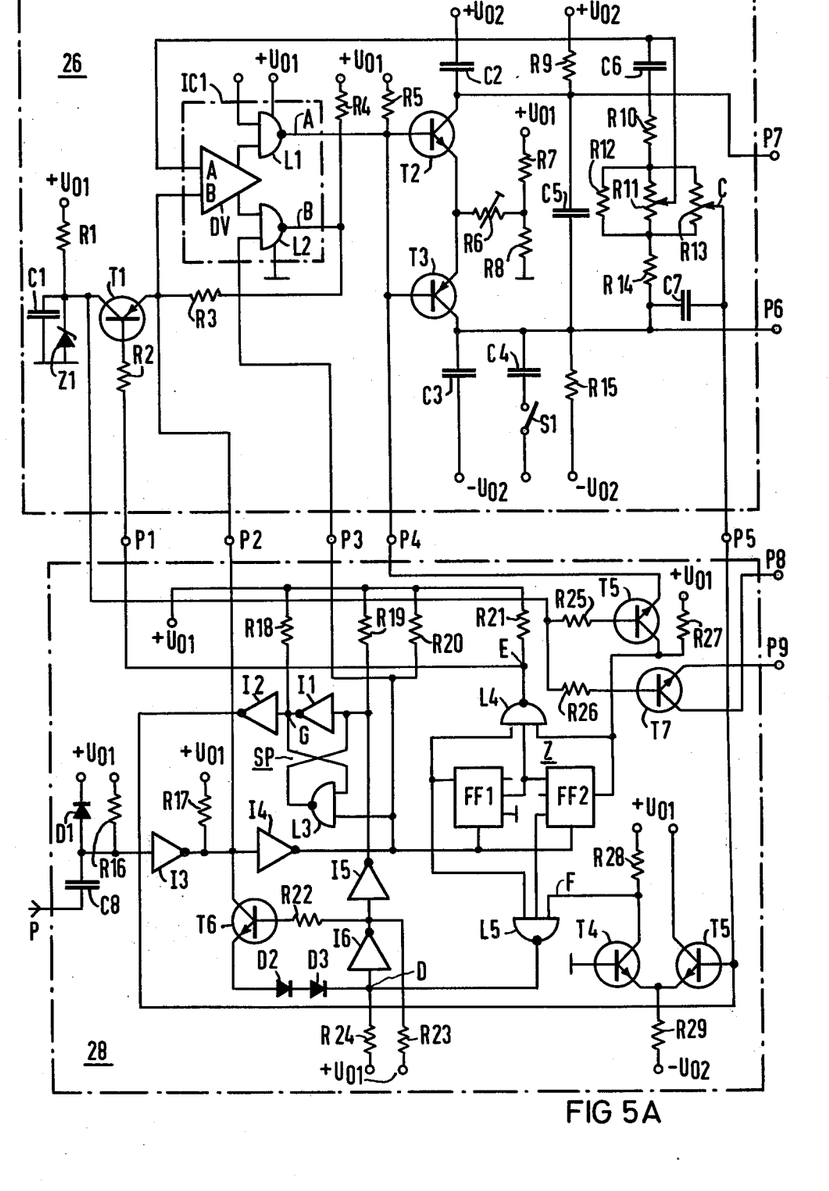
Figure 5B:
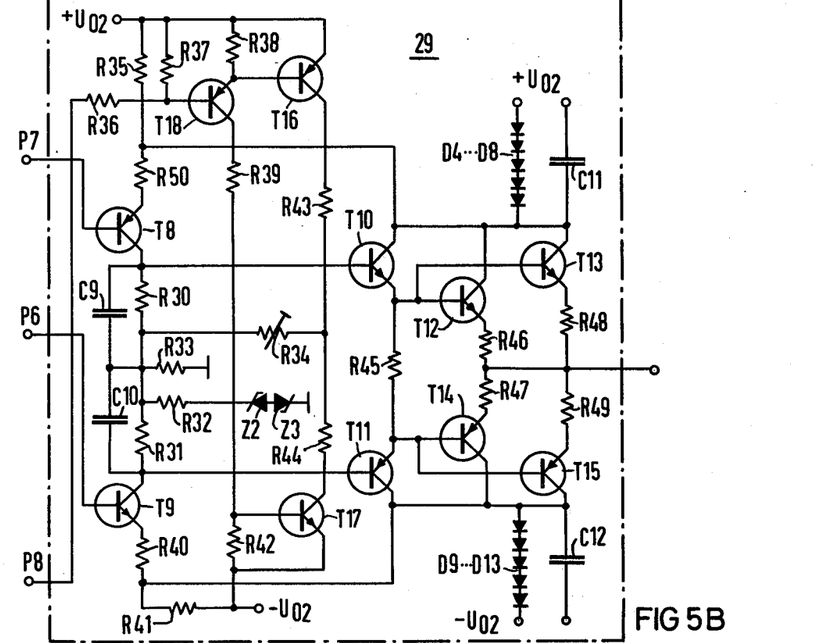

A more detailed implementaion according to the teachings of FIG. 4 is illustrated in the circuit diagram of FIG. 5. The mode of operation of the circuit arrangement of FIG. 5 is shown by the voltage characteristic waveforms of FIG. 6 and the embodiment of FIG. 5 is further explained as follows:

In FIG. 5, 26 (FIG. 5A, the upper circuit module) again designates the oscillator (triggerable delta or triangular waveform generator); 29 (FIG. 5B) designates the control amplifier (and output power amplifier); and 28 (FIG. 5A, the lower circuit module) designates the logic control. In the idle state, transistor T1 in the oscillator 26 is conductive, so that the input B of the comparator IC1 (with differential amplifier DV and logic elements L1 and L2) is held at e.g. an input voltage level of one-half the supply voltage $U_{01}$ or 2.5 volts ($U_{01}/2 = 2.5$ V). The integrator, consisting of T2, T3, C2–C7, and R6–R15 is thereby connected with its output C likewise to e.g. 2.5 V. With the falling slope of the start signal P (FIG. 6) at the input (FIG. 5A) of the sequence control logic 28, an approximately 50 ns-long pulse at P3 is produced which sets to zero the counter Z (with flip-flop FF1, FF2 and logic elements L4, L5) and the memory SP (with logic element L3 and inverter I1), so that circuit point E (at the output of logic element L4, FIG. 5A) goes to logical one (e.g. $U_{01} = +5$ V) and blocks T1. Simultaneously the output B of the comparator IC1 is forced to logical one. Since the integrator (output C) cannot follow rapid voltage changes, (the output B of logic element L2 (FIG. 5A) is, however, coupled back to input B of the comparator), the output A of the comparator remains in the initial logical zero condition (0 V); the output B of the comparator IC1 remains at logical one level even after the pulse at P3 has disappeared. The logic zero at the output A of the comparator IC1 blocks T2 and shifts T3 into the conductive state. T3 now operates as a constant current source controlling current flow to C3 (and C4, in case switch S1 for lower frequencies is closed). Since C5>>C3, C4, the current is similarly transmitted to C2 and likewise recharges this capacitor. The voltage at point C now increases in a time-linear fashion until it reaches the voltage value connected to input B of differential amplifier DV (for example, +5 V). A slight exceeding of this value is sufficient in order to cause the comparator IC1 to flip over (trigger); the voltage at point B at the output of logic element L2 then drops to enlarge the differential voltage between input A of differential amplifier DV and input B thereto in the sense of a positive (or regenerative) feedback until the stable condition output A at logical one level, output B at logical zero (A=1, B=0) has been obtained. The integrator operates in an opposite direction (T2 conductive, T3 blocked) until reaching the lower transition (or switchover) point (C=0 V) etc. The following falling slopes of the output A (see waveform A of FIG. 6) are jointly counted in counter Z. At ¼th period prior to the end of the second full oscillation, the counter is at the position FF1 set, FF2 reset (1, 0). With the zero crossing of the a.c. component of waveform C, FIG. 6, at the end of two complete oscillations, point F goes to logical one, so that D drops to logical zero. The comparator input B is thereby brought from logical one to logical zero, and the oscillation is thereby thrown into the opposite phase position. F thus again drops and again releases the omparator input B with circuit point D at a logic one level (D=1). The memory SP is simultaneously set via T6 and I4, and the latter memory ensures that the amplification of the terminal amplifier drops to e.g. half. Again ¼ period prior to the end of the third full oscillation, with the rise of A, E goes to logical zero and clamps the potential of the comparator input B at e.g. 2.5 V. The integrator output C can now continue to drop only to this voltage and remains there until the next start pulse.

In the long pulse pauses the capacitor C5 has the opportunity of regenerating its charge.

Figure 6:
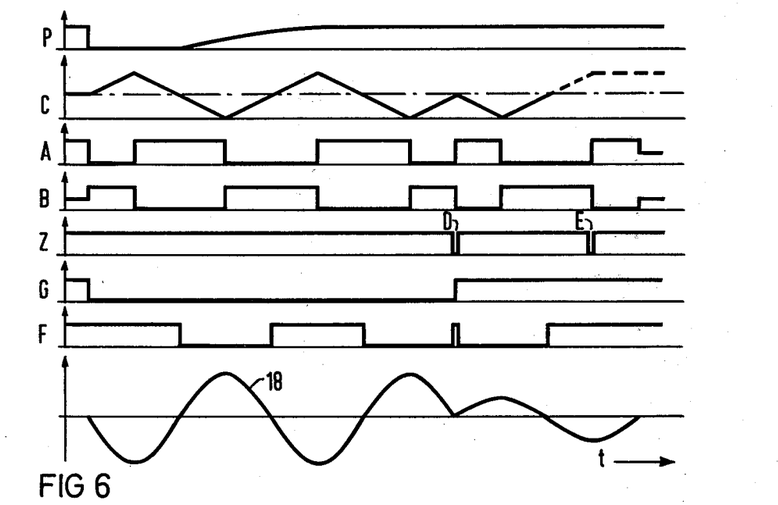
FIG. 6 shows a diagram of the chronological progressions or waveforms of the most significant voltages occurring in the circuit diagram of FIG. 5.

At potentiometer R6 the frequency can be adjusted within narrow boundaries (i.e. over a narrow range). With potentiometer R11, small asymmetries of the triangular (or delta) waveform (FIG. 6 at C) as compared with the zero line can be corrected. With potentiometer R13, the commencement of the third period can be varied within narrow boundaries. At terminals P6, P7, identical a.c. current signals are available with different d.c. voltages, so that the coupling of a complementary input of the output power amplifier 29 is unproblematical. The collector resistance of this stage consists, during the first two periods, of R33 in cooperation with R32, Z2, Z3. The resistance R33 alone would result in a voltage amplitude of more than e.g. ±20 V. Through the series-connection of R32, Z2, Z3, the delta (or triangular) peak is strongly flattened, so that the sine-form is well approximated. The capacitances of the circuit (particularly of Z2, Z3, FIG. 5B) perform an extra function for the purpose of rounding the edges by means of low-pass action (or effect). For the third period, T16, T17 (FIG. 5B), are rendered conductive, so that R34, R35 and R36 connect (or hook up) and approximately halve (or cut in half) the collector resistance, as a consequence of which the amplification, or the output amplitude, respectively, is halved (adjustment through R34). It is now possible to dispense with a "rounding", because no blocking voltage problem is present. The transistors T10 through T15 form the power stage. Their transverse current is automatically adjusted in terms of d.c. current through negative feedback by means of resistances R30, R31, R41, R43, such that transfer distortions (in the range of small voltages) remain sufficiently small. The desired combination oscillation 18 according to FIG. 6 is then available at the output (taken from the common circuit point between R48 and R49) of the output power amplifier 29, FIG. 5B.

It will be apparent that many modifications and variations may be effected without departing from the scope of the novel concepts and teachings of the present invention.

We claim as our invention:

1. A circuit arrangement for carrying out the method comprising:
    generating an electric high frequency pulse in the form of a driving periodic oscillation of predetermined amplitude and of a driving frequency corresponding to a useful resonance frequency of an ultrasonic transducer, and having a first phase, generating a stop signal whose frequency is the same as said driving frequency but having a second phase offset by substantially 180° in relation to the first phase of said driving periodic oscillation, applying to said ultrasonic transducer a predetermined number of periods of said driving periodic oscillation (7) of said predetermined amplitude and of said driving frequency and of said first phase, and then applying to said ultrasonic transducer said stop signal (9) having the same frequency as said driving frequency, having said second phase offset by substantially 180° in relation to said first phase, and having a substantially smaller amplitude than said predetermined amplitude of said periodic oscillation (7),
    said circuit arrangement comprising
    an ultrasonic transducer having the useful resonance frequency,
    oscillator means for generating a driving periodic oscillation of said predetermined amplitude and of said driving frequency corresponding to said useful resonance frequency and of said first phase, and for thereafter generating said stop signal of the same frequency as said driving frequency but having a second phase offset by substantially 180° relative to said first phase, and
    control means controlling said oscillator means to supply to said ultrasonic transducer first said predetermined number of periods of said driving periodic oscillation of said predetermined amplitude, and then said stop signal, such that said stop signal as applied to said ultrasonic transducer has a substantially smaller amplitude than said predetermined amplitude of said driving periodic oscillation,
    said oscillator means comprising first means (5) for supplying a first sinusoidal oscillation (7) as said driving periodic oscillation, and second means (6, 8) for supplying a second sinusoidal oscillation (9) as said stop signal with said second sinusoidal signal having about one-half the amplitude and a 180° phase shift in comparison to said first sinusoidal oscillation, and said control means comprising switching means (10, 11) between said first and second means and said ultrasonic transducer for first supplying said predetermined number of periods of said first sinusoidal oscillation (7) to said ultrasonic transducer and then supplying to said ultrasonic transducer a predetermined number of periods of said second sinusoidal oscillation (9), said second means comprising an output (6) supplying a sinusoidal oscillation corresponding to said first sinusoidal oscillation, and phase inversion and amplitude attenuation means (8) connected with said output (6) and with said switching means (10, 11) for supplying said second sinusoidal oscillation (9) to said switching means.

2. A circuit arrangement according to claim 1, with said oscillator means comprising an oscillator (4) with a quartz frequency-determining element having a resonant frequency corresponding to said useful resonance frequency of said ultrasonic transducer.

3. A circuit arrangement according to claim 1, with said oscillator means comprising an electrical capacitance and inductance frequency-determining circuit tuned to said useful resonance frequency of said ultrasonic transducer.

4. A circuit arrangement according to claim 1, with said oscillator means comprising a Wien-bridge-oscillator tuned to said useful resonance frequency of said ultrasonic transducer.

5. A circuit arrangement according to claim 1, with said oscillator means comprising an RC-phase shifter oscillator tuned to said useful resonance frequency of said ultrasonic transducer.

6. A circuit arrangement according to claim 1, with said oscillator means comprising an oscillator with an all-pass network of the second order tuned to said useful resonance frequency of said ultrasonic transducer.

7. A circuit arrangement according to claim 1, with said oscillator means being controlled by said control means to supply to said ultrasonic transducer about two oscillations of substantially sinusoidal waveform (7) as said periodic oscillation and for supplying about one oscillation of substantially sinusoidal oscillation (9) as said stop signal.

8. A circuit arrangement for carrying out the method comprising:
generating an electric high frequency pulse in the form of a driving periodic oscillation of predetermined amplitude and of a driving frequency corresponding to a useful resonance frequency of an ultrasonic transducer, and having a first phase, generating a stop signal whose frequency is the same as said driving frequency but having a second phase offset by substantially 180° in relation to the first phase of said driving periodic oscillation, applying to said ultrasonic transducer a predetermined number of periods of said driving periodic oscillation (7) of said predetermined amplitude and of said driving frequency and of said first phase, and then applying to said ultrasonic transducer said stop signal (9) having the same frequency as said driving frequency, having said second phase offset by substantially 180° in relation to said first phase, and having a substantially smaller amplitude than said predetermined amplitude of said periodic oscillation (7),
said circuit arrangement comprising
an ultrasonic transducer having the useful resonance frequency,
oscillator means for generating a driving periodic osciallation of said predetermined amplitude and of said driving frequency corresponding to said useful resonance frequency and of said first phase, and for thereafter generating said stop signal of the same frequency as said driving frequency but having a second phase offset by substantially 180° relative to said first phase, and
control means controlling said osicllator means to supply to said ultrasonic transducer first said predetermined number of periods of said driving periodic oscillation of said predetermind amplitude, and then said stop signal, such that said stop signal as applied to said ultrasonic transducer has a substantially smaller amplitude than said predetermind amplitude of said driving periodic oscillation, said oscillator means comprising first and second triggerable oscillators (19, 20), and said control means (22) being responsive to supply of a predetermined number of oscillations (7) from the first oscillator (19) to trigger said second oscillator (20) to supply to said ultrasonic transducer a predetermined number of periods of a periodic oscillation as said stop signal,
an adding element (21) having respective inputs connected to said first and second triggerable oscillators (19, 20) and having an output connected to said ultrasonic transducer.

9. A circuit arrangement for carrying out the method comprising:
generating an electric high frequency pulse in the form of a driving periodic oscillation of predetermined amplitude and of a driving frequency corresponding to a useful resonance frequency of an ultrasonic transducer, and having a first phase, generating a stop signal whose frequency is the same as said driving frequency but having a second phase offset by substantially 180° in relation to the first phase of said driving periodic oscillation, applying to said ultrasonic transducer a predetermined number of periods of said driving periodic oscillation (7) of said predetermined amplitude and of said driving frequency and of said first phase, and then applying to said ultrasonic transducer said stop signal (9) having the same frequency as said driving frequency, having said second phase offset by substantially 180° in relation to said first phase, and having a substantially smaller amplitude than said predetermined amplitude of said periodic oscillation (7),
said circuit arrangement comprising
an ultrasonic transducer having the useful resonance frequency,
oscillator means for generating a driving periodic oscillation of said predetermined amplitude and of said driving frequency corresponding to said useful resonance frequency and of said first phase, and for thereafter generating said stop signal of the same frequency as said driving frequency but having a second phase offset by substantially 180° relative to said first phase, and
control means controlling said oscillator means to supply to said ultrasonic transducer first said predetermined number of periods of said driving periodic oscillation of said predetermined amplitude, and then said stop signal, such that said stop signal as applied to said ultrasonic transducer has a substantially smaller amplitude than said predetermind amplitude of said driving periodic oscillation,
said oscillator means comprising a single oscillator (23) responsive to a start pulse to produce a number of oscillations corresponding to the total number of oscillations of said driving periodic oscillation and said stop signal to be supplied to said ultrasonic transducer, and said control means comprising a switching device (24) having a first input channel connected directly with said oscillator (23), having a second input channel, and having an output connected with said ultrasonic transducer, said oscillator means further comprising amplitude attenuation and phase inversion means (8) between said oscillator (23) and said second input channel to supply said stop signal to said ultrasonic under the control of said switching device.

10. A circuit arrangement for carrying out the method comprising:
generating an electric high frequency pulse in the form of a driving periodic oscillation of predetermined amplitude and of a driving frequency corresponding to a useful resonance frequency of an ultrasonic transducer, and having a first phase, generating a stop signal whose frequency is the same as said driving frequency but having a second phase offset by substantially 180° in relation to the first phase of said driving periodic oscillation, applying to said ultrasonic transducer a predetermined number of periods of said driving periodic oscillation (7) of said predetermined amplitude and of said driving frequency and of said first phase, and then applying to said ultrasonic transducer said stop signal (9) having the same frequency as said driving frequency, having said second phase offset by substantially 180° in relation to said first phase, and having a substantially smaller amplitude than said predetermined amplitude of said periodic oscillation (7),
said circuit arrangement comprising
an ultrasonic transducer having the useful resonance frequency,
oscillator means for generating a driving periodic oscillation of said predetermined amplitude and of said driving frequency corresponding to said useful resonance frequency and of said first phase, and for thereafter generating said stop signal of the same frequency as said driving frequency but having a second phase offset by substantially 180° relative to said first phase, and control means controlling said oscillator means to supply to said ultrasonic transducer first said predetermined number of periods of said driving periodic oscillation of said predetermined amplitude, and then said stop signal, such that said stop signal as applied to said ultrasonic transducer has a substantially smaller amplitude than said predetermined amplitude of said driving periodic oscillation, said oscillator means comprising an oscillator (26) with two control inputs (16, 27) and an output, said oscillator supplying at its output in response to a start pulse at one control input (16) said driving periodic oscillation, and said control means being responsive to the driving periodic oscillation to actuate the other control input of said oscillator (26) to supply said stop signal at its output.

11. A circuit arrangement according to claim 10, with said oscillator means comprising astable oscillator means for supplying said periodic oscillation (7) and said stop signal (9').

12. A circuit arrangement according to claim 10, with said oscillator means comprising astable generator means having a generator output for supplying a rectangular waveform periodic oscillation, and an integrator connected with the output of said generator means for supplying a waveform which is the time integral of said rectangular waveform periodic oscillation to provide said driving periodic oscillation of said driving frequency for said ultrasonic transducer.

13. A circuit arrangement according to claim 12, with said oscillator means further comprising non-linear means connected with said integrator for conversion of an output triangular waveform periodic oscillation into a generally sinusoidal oscillation for supplying said driving periodic oscillation and said stop signal.

14. A circuit arrangement according to claim 10, with said control means actuating the other control input of said oscillator (26) to produce only about one oscillation of said second phase at the output of said oscillator (26).

15. A circuit arrangement according to claim 10, with said control means comprising amplitude attentuation means (29) connected with the output of said oscillator (26) for transmitting the driving periodic oscillation to said ultrasonic transducer with a first amplitude and for introducing substantial attenuation in the transmission of the stop signal to said ultrasonic transducer to that the stop signal is supplied with a second amplitude substantially reduced in comparison to said first amplitude.

* * * * *